(No Model.) 3 Sheets—Sheet 1.
W. VAN HORN.
MACHINE FOR MAKING FENCES.
No. 352,939. Patented Nov. 23, 1886.
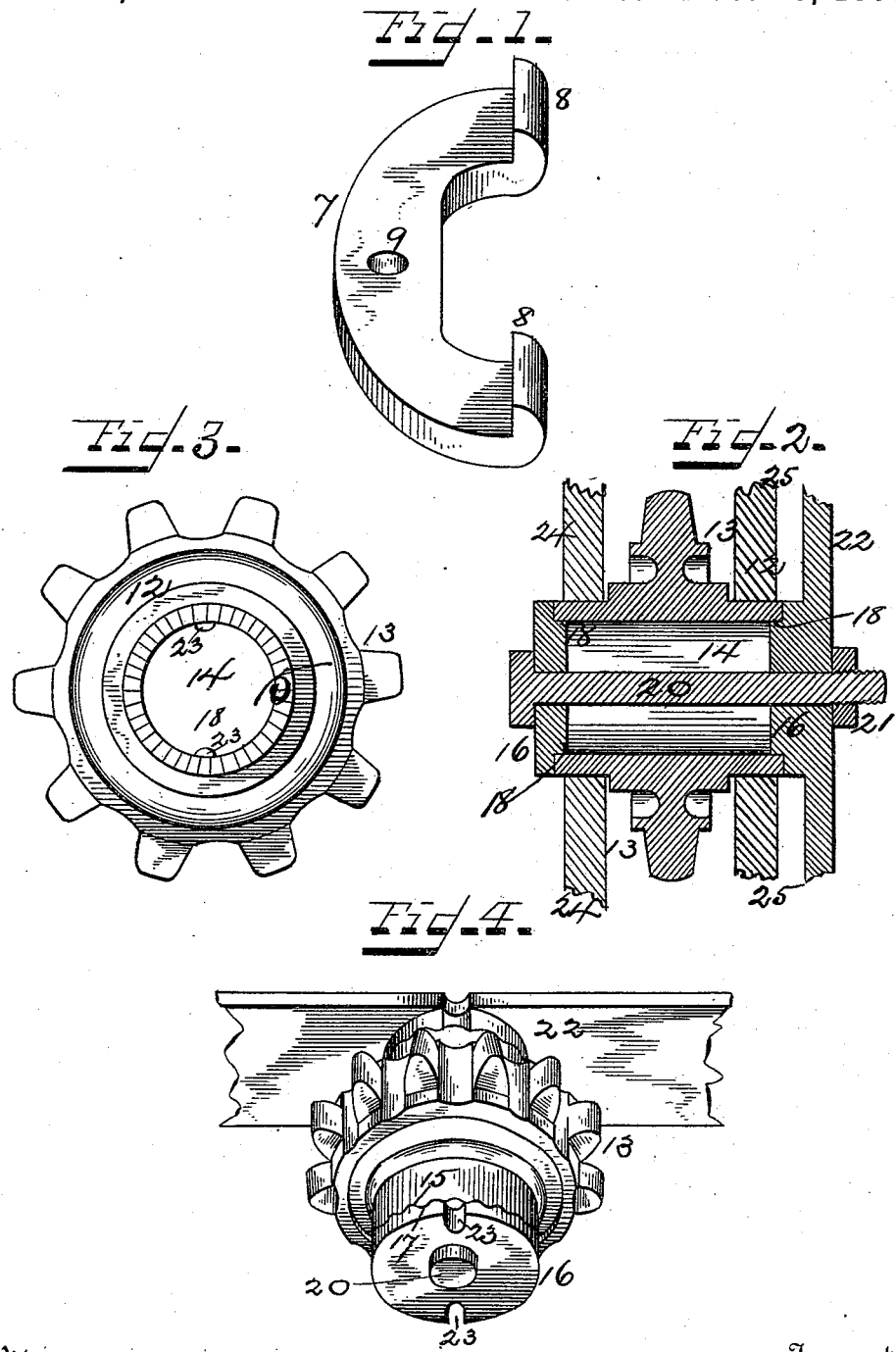
Witnesses
J. Thomson Cross
Henry Gardner Jr.
Inventor
William Van Horn,
By his Attorney
Chas. J. Gooch (No Model.) 3 Sheets—Sheet 2.
W. VAN HORN.
MACHINE FOR MAKING FENCES.
No. 352,939. Patented Nov. 23, 1886.
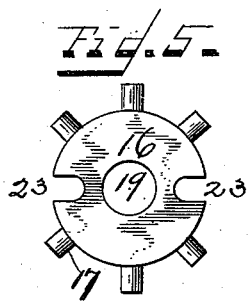
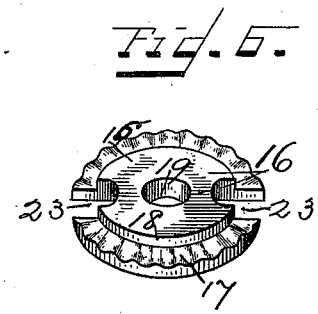
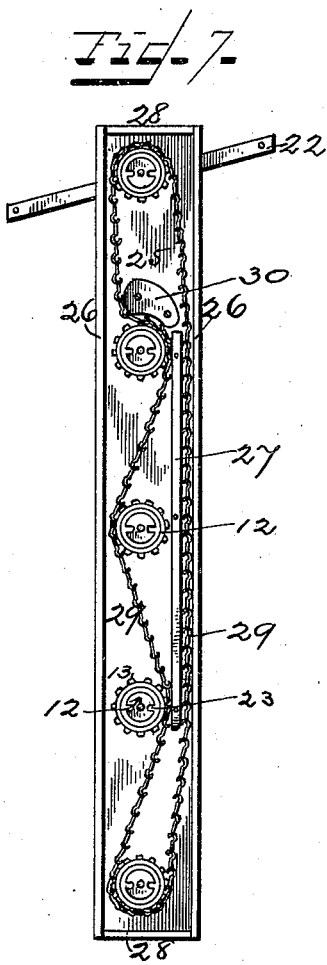
Witnesses
J. Thomson Cross
Henry Gardner Jr.
Inventor
William Van Horn,
By his Attorney
Chas J Gooch.

(No Model.) 3 Sheets—Sheet 3.
W. VAN HORN.
MACHINE FOR MAKING FENCES.
No. 352,939. Patented Nov. 23, 1886.
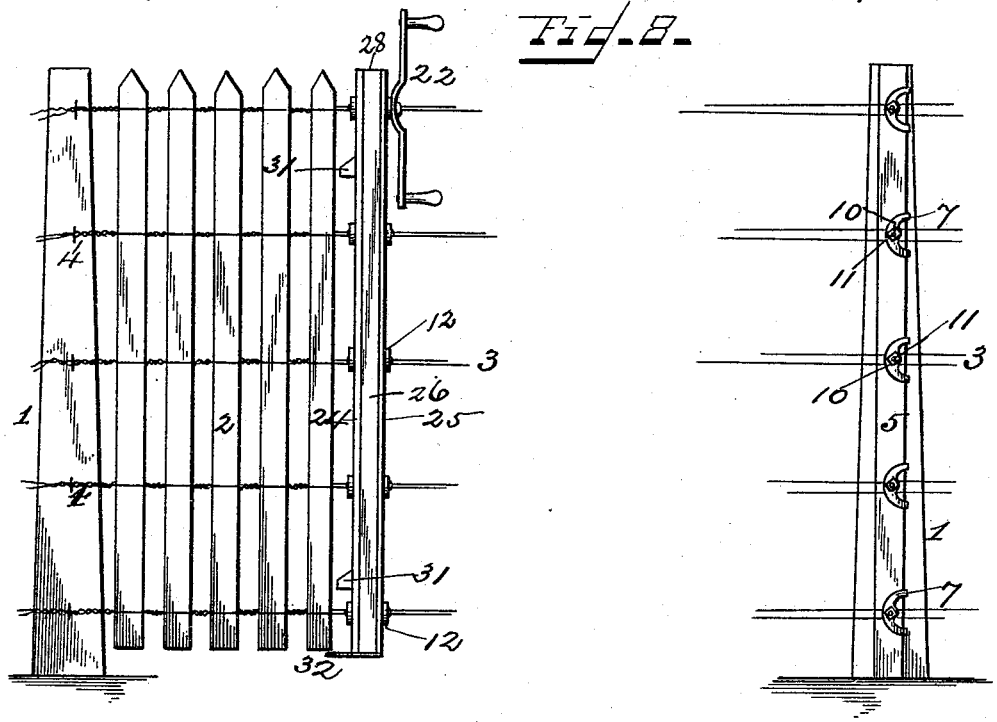
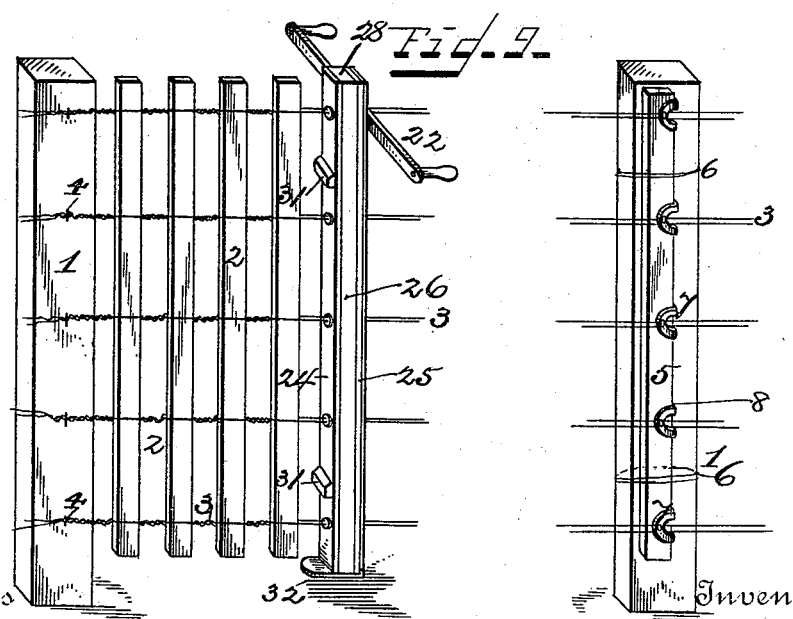
Witnesses
J. Thomson Cross
Henry Gardner Jr.
Inventor
William Van Horn,
By his Attorney
Chas. J. Gooch.

UNITED STATES PATENT OFFICE.

WILLIAM VAN HORN, OF PIQUA, OHIO.

MACHINE FOR MAKING FENCES.

SPECIFICATION forming part of Letters Patent No. 352,939, dated November 23, 1886.

Application filed March 27, 1886. Serial No. 196,847. (No model.)

*To all whom it may concern:*

Be it known that I, WILLIAM VAN HORN, a citizen of the United States, residing at Piqua, in the county of Miami and State of Ohio, have invented certain new and useful Improvements in Machines for Making Fences; and I do hereby declare the following to be a full, clear, and exact description of the invention, such as will enable others skilled in the art to which it appertains to make and use the same.

My invention relates to that class of fence-machines known as "portable" or "field" machines; and the objects are to provide, first, a very light, yet strong and durable, machine; second, means for readily adjusting the twisters when they become disarranged by reason of the stretching of the sprocket-chain, or from any other cause, and for allowing spliced wires to pass through without cutting them; third, means for readily securing the desired amount of tension upon the wires at any point along the line of fence in the rear of the machine; fourth, means for readily attaching or detaching the crank and applying it to either end of any one of the series of twisters. All of these objects are attained by the mechanism illustrated in the accompanying drawings, in which—

Figure 1 represents an under perspective view of the tension-plate. Fig. 2 is a longitudinal sectional view of the twister with a section of the crank attached. Fig. 3 is an end elevation of the sprocket-wheel and its hub, which is one of the component parts of the twister. Fig. 4 is a perspective view of the twister with a portion of the crank attached. Figs. 5 and 6 represent disks forming component parts of the twister, the several parts in the above figures being shown to full size. Fig. 7 is a vertical front view of the machine with the front cover of the frame removed. Fig. 8 is a side elevation, and Fig. 9 a perspective view of the machine as operated in the field.

Similar letters refer to corresponding parts throughout the several views.

1 represents the fence-posts; 2, the pickets; 3, the wires; 4, the staples by which the respective ends of the wires are connected to said posts.

5 represents a tension-bar, which is connected to the rear post supporting the wire clamping and tension devices by any suitable means—such, for instance, as by wires 6, wrapped around the same. To the outer face of this tension-bar 5 are attached by bolts and nuts a series of wire guiding, tension, or clamping plates, 7, of curved or horseshoe shape, and having on their arms inwardly-extending curved claws 8, which, when said plates are in position upon the tension-bar 5, embrace and grip one edge thereof, and thus serve to hold said bar in position, and also act as guides to the wires in their passage to the twisting mechanism and prevent their spreading too far apart.

9 represents a hole formed transversely through the curved portion of the wire clamping and tension plate, through which the bolt securing the same to the tension-bar 5 passes. The number of these tension-plates and their relative distance apart depend upon the number of slat-securing wires 3 employed in the construction of the fence. Inasmuch as these wire-tension plates are so secured to the tension-bar 5 by bolts and nuts as to leave sufficient space between their under faces and the outer face of the bar 5 to permit of the wires passing between the same, the necessity of the claws 8 will be apparent, as they by their gripping contact with the edge of said bar 5 effectually prevent the tension-plates swinging out of position in either direction by the frictional passage of the wires between said bars and plates during operation. The necessary degree of tension exerted upon the wires by said plates 7 is readily secured by tightening or loosening the nuts 10 on the bolts 11, securing said plates to the tension-bar.

The wire-twisters 12 are each composed of a sprocket-wheel, 13, having an extended hollow hub, 14, disks 16, having slots 23, communicating with the hollow hub, and through which the wires pass, and a central hole or orifice, 19, through which passes a bolt, 20, having nut 21, which secures said disks and the operative crank 22 to said hub and wheel. The ends of the hollow hub 14 are corrugated or notched, as shown at 15. The disks 16 also have corrugated or notched under faces, 17, to engage with the notches 15 on the wheel-hub. Inturned flanges or shoulders 18 on the disks 16, which pass and fit within the hollow hub, while an advantageous feature to prevent side-motion of the disks, are not an essential feature when the corrugations or notches are used, as such notches also prevent such side motion. The crank 22, by which the twisters are rotated, may either be cast or otherwise integrally formed with one of said disks 16, as shown in Fig. 2; or it may be formed separately therefrom, of wrought or cast metal, and connected thereto by the bolt 20 and nut 21, or by rivets, as desired.

By forming the notches, corrugations, or teeth 17 on the disks and similar notches, 15, on the hub ends, when the parts are in position and connected by the bolt and nut 20 21, the disks are securely held from independent rotary motion, and I thus effectually guard against any possibility of the disks 16 turning, and thereby disarranging the relative positions of the slots 23. The advantages of this arrangement are, the bolt 20 being removable, the disks 16 are detachable, thereby allowing a splice in the wire to pass through without the necessity of first cutting the wire. By simply loosening the nut 21 the disks 16 can be turned so that the slots 23 on any one disk will assume any desired relative position to the slots in any other disk in the series of twisters.

As the crank 22 is attached to one of the disks 16, either by being cast integrally therewith or by being formed separately therefrom and riveted thereto, and as the disks 16 and hubs 14 are made interchangeable, it is evident that the crank can be attached to or detached from any one of the series of twisters. If the crank is made wider than the space between the slots 23, it should have its edges notched to allow of the passage of the wires 3. It sometimes happens that wire-twisters that are operated by a sprocket wheel and chain become disarranged, and the wire-holes thereby lose their proper relative positions to each other in the series of wire-twisters, so that the wires do not stand in a proper position, making it difficult to place the pickets between them. In this machine, if the twisters become disarranged from the stretching of the sprocket-chain or from any other cause, they can readily be readjusted by simply loosening the nut 21 sufficiently to allow the disk 16 to be turned on the bolt 20 until the slots 23 occupy the proper relative position, when the nut is again tightened so as to hold the disk in position. It is also sometimes necessary to work over splices in the wire, and in making fence in the field the wires are usually stretched taut for a distance of several rods. This makes it very inconvenient to cut the wire. If, however, the nut 21 is loosened sufficiently to allow the shoulder 18 on the disk to become disengaged from the hollow hub, so that the disks can be pushed to one side or the other, the splice can be passed through the twister without cutting the wires. The slots 23 in the disks 16 should be made deep enough to allow the wires to pass through them and on the inside of the hollow hub 14.

In Fig. 7 is shown a vertical view of the twisting part of the machine from the front, with the front cover of the box-frame removed, so as to give an inside view of the mechanism and arrangement of parts. 24 is the front and 25 the rear covers, respectively, of the box-frame. Holes are bored in these two covers at suitable distances apart, which serve as journal-bearings for the ends of the hubs 14. The rear cover, 25, is fastened by means of wood-screws to the side strips, 26 26, guide-strip 27, and end strips, 28. Then the twisters 12 are placed in position as seen in Fig. 7, and the endless sprocket chain 29 is placed upon the sprocket-wheels and in zigzag contact therewith, as shown, with its free portion resting between the strip 26 and the guide-strip 27, after which the front cover is fastened on with wood-screws. The strip 27, in combination with the box-frame, forms a guideway for the sprocket-chain 29 and prevents its coming in contact with the sprocket-wheels on that side.

30 represents a concave-shaped block, which is fastened to the rear portion of the frame by wood-screws. The screw in the small end is first placed in position. Then the large end of the block is brought down against the chain until nearly all the slack in the chain is taken up and until the concaved edge of said block comes near the wheel, by which arrangement the chain is prevented getting off the wheel. As will be observed on reference to Fig. 7, the space between the strips 26 and 27 is only of sufficient width to permit of the passage of the sprocket-wheels with the chain thereon. There is not sufficient space on either side of the wheels to permit of the chain slipping off. Inasmuch as the sprocket-wheels used are very small, the chain will not stay on them unless these guide-strips are used, and it is an advantage to have the chain a little slack, as the wheels can then be more easily turned than would be the case were it taut. The advantage of having the guide-strip 27 and the strip 26 sufficiently close to the wheels to act as guards to prevent the chain slipping off will be apparent, as without such an arrangement of these strips the chain must either be maintained in a very taut condition, or else it would be frequently slipping off the wheels in using the machine.

By the use of the block 30 and the arrangement of the strips 26 and 27 above mentioned there is no danger of the chain getting off either of the wheels. The concaved block 30 serves as a guide to guide the chain to and hold it in contact with that portion of the second twister from the top not guarded by the strip 27. Inasmuch as the chain 29 is held taut between the strips 26 and 27 and is slack at that portion thereof between the two upper twisters, the chain would be apt to slip off the second wheel from the top were it not gripped and such slack pressed down upon the twister. By the employment of this block 30 the chain can be guided to and held in operative contact with a very small wheel. 31 31 are buffers which impinge against the picket and force it into the bight of the wire and prevent the racking of the frame-work. 32 is a stop for the picket.

The operation of the machine is about as follows: Having strung out the wires to the full length of the fence I contemplate making, I put the ends of the wires through the twisters, two wires to each twister, and fasten them to the end post. Then at any desired distance in the rear along the line of wires—usually from five to ten rods in the rear of the machine—I fasten the tension device to the wires, placing the wires in pairs under the tension-clamps 7— one on each side of the bolt and on the inside of the claws 8 8. The tension-bar 5 is then fastened to a post, 1, by any suitable means— such, for instance, as by the wires 6, wrapped around it and the post. The wires 3 are then stretched as tightly as can be by pulling them by hand, and the clamps 7 are tightened upon them by means of a bolt and nut. This being done, a picket is placed between the wires in front of the machine, and the wires are twisted upon it by operating the crank 22. The twist in the wire forces the machine back, giving the desired amount of space between the pickets. Before putting in a picket I run the machine back on the wires a few inches, drop in the picket, and run the machine forward and shove the picket tight between the bight of the wires, then twist the wires, reversing the motion of the crank and twisters at each alternate picket.

This machine does its own spacing, as it is so light that it can hang on the wires and be forced back by the twisting of the wires. It needs no track to run on, except the wires, and therefore requires no levers for spacing and setting.

Having thus described my invention, what I claim is—

1. A wire-twister consisting of a sprocket-wheel having a hollow hub and detachable and adjustable slotted disks, and means, substantially as described, for holding said disks in position, and means for operating the twister.

2. A wire-twister consisting of a sprocket-wheel having a hollow hub, detachable and adjustable slotted disks, a removable bolt and nut for securing said disks in position, and an operating-crank secured to one of said disks, substantially as set forth.

3. In a wire-twister, the combination of a sprocket-wheel having a hollow hub and corrugated, toothed, or notched ends, and detachable and adjustable slotted disks having similarly toothed or notched under faces to engage with the ends of the hub, and means, substantially as described, for removably securing said disks in position.

4. In a wire-twisting machine, a series of wire-twisters consisting of sprocket-wheels having hollow hubs, detachable and interchangeable adjustable slotted disks engaging with said hollow hubs, and removable bolts and nuts connecting and securing said disks in position, and an operating-crank secured to one of said disks, substantially as and for the purpose set forth.

5. The combination of a sprocket-wheel having a hollow hub, the detachable and adjustable slotted disks, and the removable bolt and nut, as and for the purpose set forth.

6. The combination of the tension-bar and the wire-clamping plates having claws, as herein described, and means for adjustably clamping said plates against the tension-bar, as and for the purpose set forth.

7. The twister-supporting frame herein described, having a series of twisters journaled therein, an endless chain connecting said twisters, a chain-gripping concaved block secured to the inner face of the frame, and a vertical strip secured to the inner face of the frame in a position adjacent to the twisters, to form, in connection with the adjacent side strip, 26, constituting a portion of the frame, a guide-way for the passage of the chain, substantially as set forth.

In testimony whereof I affix my signature in presence of two witnesses.

WILLIAM VAN HORN.

Witnesses:
HARRY T. RAYNER,
A. C. WILSON.